United States Patent
Neale

(10) Patent No.: US 7,218,998 B1
(45) Date of Patent: May 15, 2007

(54) SYSTEM AND METHOD FOR LIMITING POWER DEMAND IN AN ENERGY DELIVERY SYSTEM

(76) Inventor: Stephen D. Neale, 2600 S. Hardy Dr., Tempe, AZ (US) 85282

(*) Notice: Subject to any disclaimer, the term of this patent is extended or adjusted under 35 U.S.C. 154(b) by 16 days.

(21) Appl. No.: 11/178,841

(22) Filed: Jul. 11, 2005

(51) Int. Cl.
*G06F 19/00* (2006.01)

(52) U.S. Cl. .............. 700/295; 700/296; 700/297; 700/298; 702/57; 702/58; 713/300

(58) Field of Classification Search ........... 700/295, 700/296, 297, 298, 292; 702/57, 58, 62, 702/65, 66; 307/31, 34; 713/300, 320, 310
See application file for complete search history.

(56) References Cited

U.S. PATENT DOCUMENTS

| | | | |
|---|---|---|---|
| 5,572,438 A * | 11/1996 | Ehlers et al. ............. | 700/295 |
| 5,576,700 A * | 11/1996 | Davis et al. ............. | 340/3.31 |
| 6,311,105 B1 * | 10/2001 | Budike, Jr. ............. | 700/291 |
| 6,356,426 B1 * | 3/2002 | Dougherty ............. | 361/102 |
| 6,528,957 B1 * | 3/2003 | Luchaco ............. | 315/307 |
| 6,541,740 B2 | 4/2003 | Ziaimehr et al. | |
| 6,633,823 B2 * | 10/2003 | Bartone et al. ............. | 702/57 |
| 6,671,586 B2 | 12/2003 | Davis et al. | |
| 6,721,672 B2 * | 4/2004 | Spitaels et al. ............. | 702/62 |
| 6,836,737 B2 | 12/2004 | Petite et al. | |
| 6,862,498 B2 | 3/2005 | Davis et al. | |
| 7,092,768 B1 * | 8/2006 | Labuda ............. | 700/19 |
| 2004/0088083 A1 * | 5/2004 | Davis et al. ............. | 700/295 |

OTHER PUBLICATIONS

"A Case Study Review of Technical and technology Issues for Transition of a Utility Load Management Program to Provide System Reliability Resources in Restructured Electricity Markets" -GH Weller, Weller Associates—Ernest Orlando Lawrence Berkeley National Laboratory, Jul. 2001.*

* cited by examiner

*Primary Examiner*—Michael D. Masinick
(74) *Attorney, Agent, or Firm*—Frank J. McGue

(57) ABSTRACT

An intelligent demand controller protects the local customer premises supply transformer from overload and senses conditions on the transformer. The intelligent demand control system utilizes a communications network with a plurality of load control units having a unique address and residing at a plurality of customer premises. A demand controller monitors the voltages and frequency of electricity provided to the customer premises as well as the instantaneous current required by the operating loads of the customer premises. Each of the plurality of demand controllers may be associated with one or more of a plurality of load control units and configured to receive data related to the state of the power supplied to the plurality of controlled loads and generate a transmit message using a predefined communication protocol. When certain programmable conditions are met, a load control unit is signaled to remove power from one or more of its monitored loads.

5 Claims, 8 Drawing Sheets

SYSTEM AND METHOD FOR LIMITING POWER DEMAND IN AN ENERGY DELIVERY SYSTEM

TECHNICAL FIELD OF THE INVENTION

The present invention generally relates to controlling power demand in an electric power distribution system and, in particular, to a system and method for intelligently limiting power demand at customer premises through cycle-by-cycle monitoring of electricity provided to the customer premises, as well as monitoring of load operation by a load control unit.

BACKGROUND OF THE INVENTION

Electric utilities or distribution organizations, hereafter referred to as electricity suppliers, are responsible for supplying an economic, reliable and safe source of electricity to customers. The electricity supplier, through its' energy delivery system, provides electricity to its customers at a suitable voltage and frequency. This electricity is provided on an instantaneous basis. That is, when the customer turns on an appliance, the electricity supplier provides the electricity to the customer's appliance the instant that the customer flips the switch on.

One well-known difficulty in providing electricity to customers is precisely matching the total amount of electricity consumed by all of the customers on an instantaneous basis with the amount of electricity generated and/or purchased by the electricity supplier. The total amount of electricity used at any given instant in time is commonly referred to as demand. Demand typically is measured in units of watts, kilo-watts (KW), or mega-watts (MW). For example, a conventional light bulb may have a demand of 100 watts. Ten (10) of these light bulbs has a demand of 1 KW. If one thousand of these light bulbs are all turned on at the same instant in time, the electricity supplier must instantly provide an additional 100 KW of electricity by increasing generation and/or purchases.

Most changes in demand, either up or down, are a small percentage of the overall delivery system load and result in little, if any, mismatch between supply and demand. This minor mismatch rarely causes a measurable change in system voltage or frequency. Significant mismatches between demand and supply occur when either the delivery system or supply (generation and/or purchases) cannot meet demand. As this mismatch increases, a voltage drop starts to occur. When significant mismatches between demand and supply occur, distortion in the electric system frequency occurs.

Currently there are devices designed to automatically remove loads when either voltage or frequency are out of tolerance, both at the appliance and system level.

U.S. Pat. No. 6,541,740 entitled "Heater/Blower Unit With Load Control" which issued on Apr. 1, 2003 to Ziaimehr et al. uses a two-heater system with a method of minimizing fluctuations in the load on a high wattage electrical device.

U.S. Pat. No. 6,671,586 entitled "System and Method for Controlling Power Demand over an Integrated Wireless Network" which issued on Dec. 30, 2003 to Davis et al. discloses an intelligent network demand control system which employs a transceiver network coupled to meters and appliances.

U.S. Pat. No. 6,836,737 entitled "Systems and Methods for Providing Remote Monitoring of Consumption for a Utility Meter" which issued on Dec. 28, 2004 to Petite et al. discloses a plurality of electric meters and communications devices which define a wireless communications network for controlling the consumption of electric power.

U.S. Pat. No. 6,862,498 entitled "System and Method for Controlling Power Demand over an Integrated Wireless Network" which issued on Mar. 1, 2005 to Davis et al. provides an intelligent demand control system for an energy delivery system using a wireless transceiver network for reducing energy demand as needed.

As another example, if the electricity supplier loses a generator in an unplanned manner, the electric system demand will exceed supply. If the mismatch is sufficiently large, the electric frequency will drop from its nominal value of 60 hertz (Hz), in the United States. If the frequency drops to below 59.8 Hz, relays sense the frequency decay and operate to selectively disconnect predefined groups of customers from the energy delivery system. Demand is reduced, hopefully to the point where demand again approximately equals supply such that the frequency recovers back to its nominal 60 Hz value. Disconnecting customer loads to arrest frequency decay is known as load shedding.

Although the action of the frequency sensitive relays effectively arrests the undesirable frequency decay, thereby saving the energy delivery system from a more severe decay in frequency and other undesirable associated problems, those customers that were disconnected did not volunteer to be selected as participants in the load-shedding scheme. Furthermore, the electricity supplier loses the associated sales to the affected customers, thereby negatively impacting the electricity supplier's revenue stream.

One well-known technique to decrease the frequency of occurrence of these undesirable mismatches between energy demand and supply is to couple selected energy consuming loads to radio frequency (RF) controlled receivers. Then, when a mismatch in demand and supply occurs, or when the electricity supplier anticipates that a mismatch occurrence is eminent, the electricity supplier orders the shut off of the selected energy consuming loads by transmitting a shut-off signal to the RF receivers. Such a group of aggregated loads is commonly referred to as a load block. Participation in such a load block is typically voluntary. Often, customers are offered incentives to participate. For example, a customer can be given a decrease in rate and/or a rebate to voluntarily allow the electricity supplier to couple an RF receiver to their load.

The previous example is based upon mismatches when supply (generation and/or purchases) does not match demand. Mismatches occurring due to the delivery system inadequacies are something that the electricity supplier cannot easily monitor or correct. A local customer premises transformer can be overloaded due to concurrent demands from each of the residences. Also a transformer that is feeding a plurality of customer premises transformers can become overloaded without affecting the majority of the delivery system. These types of problems are very expensive for an electricity supplier to remedy, as it involves major changes to the delivery system.

With all of these methodologies, the electricity supplier is still faced with the peak demands that are placed on the energy delivery system everyday. Many electricity suppliers offer rate structures that provide an incentive to utilize power during typical 'off-peak' times. This approach may limit demand peaks during one time frame, however it most often causes another. Electricity suppliers can increase generating capacity and/or purchase additional power to support these peak demands. Either approach means that the cost of the electricity is more than during normal operation, thereby negatively impacting the electricity supplier's revenue stream.

Yet another problem that the electricity supplier faces is the power factor issue that occurs due to HVAC units (or any significant motor load). Some electricity suppliers utilize constant voltage transformers (CVT) to help offset power factor influences. Another philosophy is to switch large banks of capacitors in or out of a circuit as necessary. This is not typically an approach that can be used to correct a power factor issue quickly, as personnel must be sent out to switch these banks. Most implementations of capacitor bank switching is done on a seasonal basis, due to anticipated motor loads. Some electricity suppliers have implemented capacitor bank switching at the substation level and do so without requiring personnel to be sent out. This still does little to affect the more local overloading that occurs due to power factor influences.

Thus, a need exists in the industry for providing a demand limiting and control system that accurately monitors the supplied electricity and intelligently determines the need for load shedding, in real time. Also, there is a need in the industry to provide a system that allows for selective determination of the best combination of loads to meet the desired reduction. There is also a need to allow the customer to determine what load(s) is available for shut-off. And finally a need in the industry is to control power factor throughout the energy delivery system such that energy losses due to overheating of components is reduced to a minimum.

The present invention meets these needs.

SUMMARY OF THE INVENTION

The present invention overcomes the inadequacies and deficiencies of the prior art as discussed herein above. One embodiment of the present invention, an intelligent demand limiting system, provides a system and method for monitoring an electricity source and determining the conditions under which the local supply transformer is operating. The intelligent demand limiting system employs a communication network with a plurality of demand controllers residing at a plurality of customer premises. Each demand controller is in direct communications with a plurality of load control units. Customer premises load control units are coupled to loads located in the plurality of customer premises. The demand controllers and load control units each have unique identification codes. In one embodiment, the demand controller analyzes the customer premises electricity supply and determines the state of the local supply transformer.

This state may be a local overload condition, or a more serious system wide problem. In either case, operating conditions that are outside of the expected norm are compensated for by limiting the demand placed on the local supply transformer. When a plurality of demand controllers, at a plurality of customer premises, are monitoring electricity from a common transformer, these intelligent controllers will negotiate the appropriate action. The processing of the information relative to the state of the local supply transformer allows any or all loads to be shut-off within one cycle (16.6 milliseconds) of an out-of-norm condition. The monitoring capabilities of the load control unit(s) provide real time information relative to the operating state of all attached loads.

In one embodiment, the electricity supplier may communicate with the demand controller for purposes of adjusting the trigger points utilized to define out-of-norm conditions. This communication method uses standardized digital communication formats such that the information is communicated as packetized units of digital data. Other embodiments employ other suitable communication formats. The communications format and method are outside the scope of this disclosure.

In another embodiment, the electricity supplier may retrieve information stored by the demand controller for purposes of evaluating transformer sizing and/or patterns of out-of-norm conditions.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION

In general, the present invention relates to a system and method for providing an electricity supplier indirect control over selected customer loads such that the controlled loads are selectively shut off during periods of time when the electricity source is operating outside of defined parameters. Local analysis of the energy delivery system provides for early warning and abatement based upon minor deviations in the electricity source. This early warning allows the energy delivery system to maintain an electricity source to all customers with a minimum of inconvenience, and thereby minimally impacting the electricity supplier's revenue steam. System demand is defined herein to be the instantaneous amount of electricity, including customer loads and electric system transmission losses, that the electricity supplier either generates or purchases to provide service to its customers. Customers are defined herein to include residential customers (individuals or families living in homes, apartments, condominiums or the like), retail customers (such as retail stores, shopping malls, small businesses or the like) and wholesale customers (such as manufacturers, producers or the like). Although the characteristics of residential customers, retail customers and wholesale customers are very different from each other, the intelligent demand control system is designed to apply equally well to any customer class.

It should be noted that all references to defined parameters within this specification are typically derived from logged data specific to a customer premises transformer. Initial values are used to approximate conditions at a customer premises transformer, however actual operational data is used to modify these values based upon real world conditions. Main feed length and size, from the customer premises to the customer premises transformer, is just one of the factors considered in modifying the defined parameters.

Figure 1:
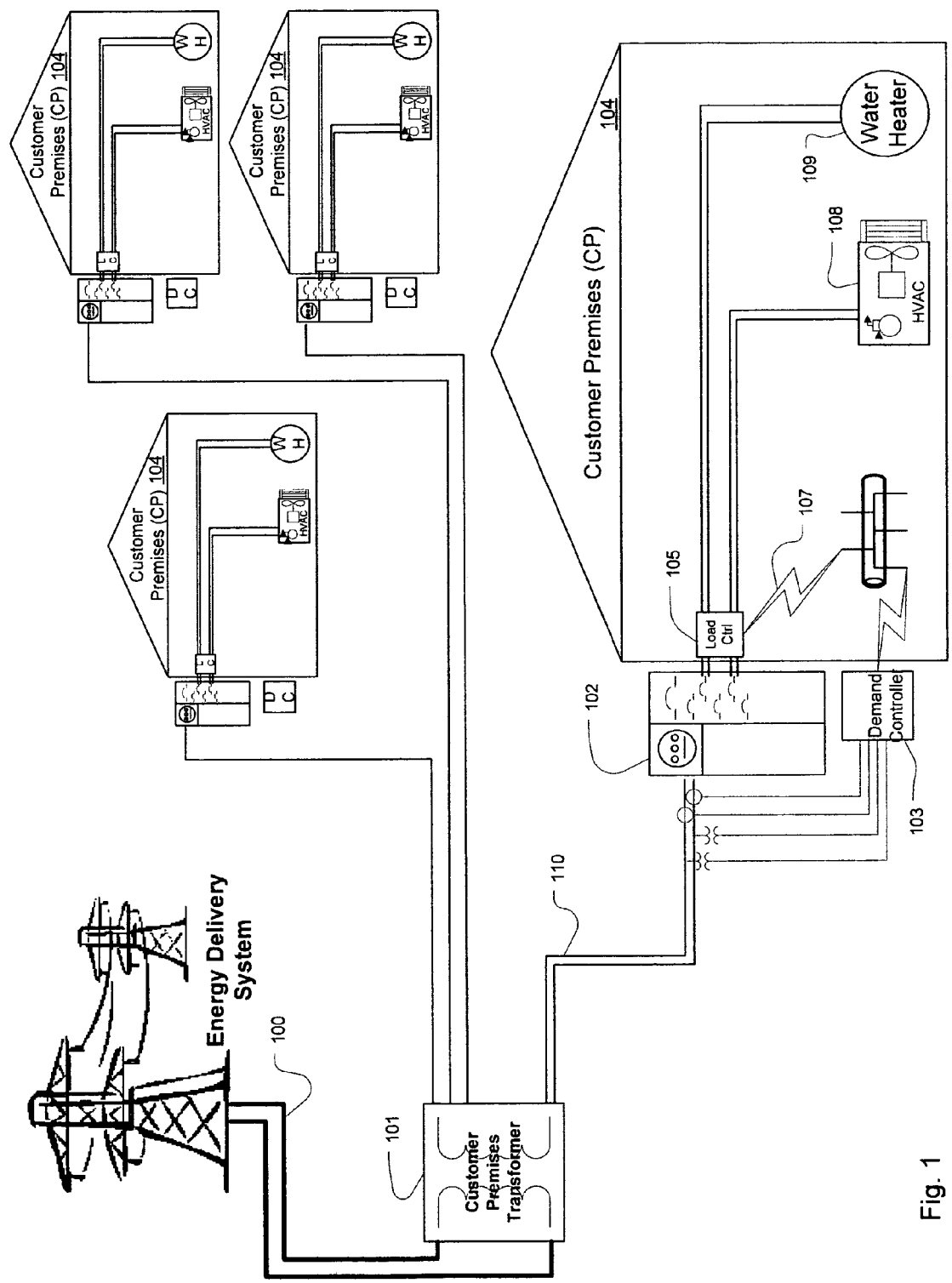
FIG. 1 is a block diagram illustrating a portion of a plurality of demand controllers residing at a plurality of customer premises, and fed by a common customer premise transformer.
Figure 2:
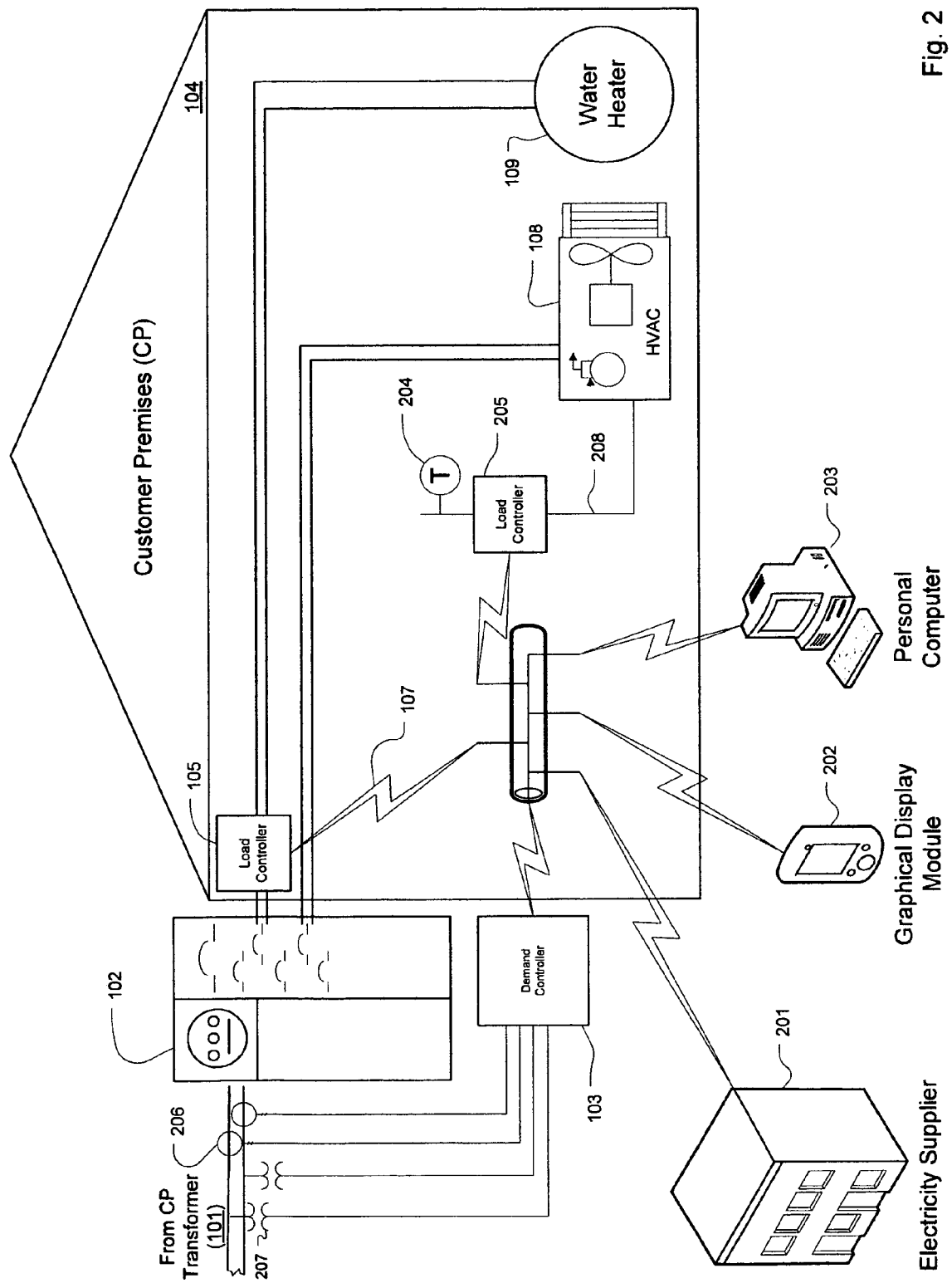
FIG. 2 is a block diagram illustrating selected components residing at one of the exemplary customer premises of FIG. 1.

FIG. 1 is a block diagram illustrating a portion of a plurality of demand controllers 103 residing at a plurality of customer premises 104, and fed by a common customer premises transformer 101. As best seen in FIG. 2, each demand controller 103, described in more detail below, is coupled to the main feed electrical lines 110 at the meter 102 of customer premises 104. Upon detecting line conditions that are outside of defined parameters, demand controller 103 sends a command via a communications link 107 to one or more of a plurality of load controllers 105 to shut off one or more loads on the one or more load controllers 105. In one embodiment, the plurality of demand controllers 103 residing at each of the plurality of customer premises 104 are being supplied by customer premises transformer 101 communicate with each other via communications link 107 to determine a response to the line condition parameters. The system and method for these communications may include, but is not limited to, a public switched telephone network 341, a digital communications system 342, or a utility communications system 343, as referenced in FIG. 3. The representation of a water heater 109 and an HVAC unit 108 is for demonstration purposes only and may in fact be any load.

As best seen in FIG. 2, demand controller 103 monitors the main feed electrical lines of customer premises 104 with a plurality of current transformers 206 and voltage transformers 207 on a cycle-by-cycle basis. In one embodiment, an electricity supplier 201 can set the defined parameters that cause a controlled load to be shut off. Additional parameters could be set to determine the conditions under which the shed load(s) would be allowed to resume operation. A graphical display module 202 and/or a personal computer 203 are utilized to allow the customer to identify and prioritize which load(s) may be shut off when a line condition is outside of defined parameters. In one embodiment, an HVAC load controller 205 may be utilized to control the operation of an HVAC unit 108 by interrupting a control line 208 between a thermostat 204 and HVAC unit 108. In this embodiment a multi-stage HVAC unit can be controlled to provide the necessary load reduction while causing a minimal inconvenience to the customer.

Figure 3:
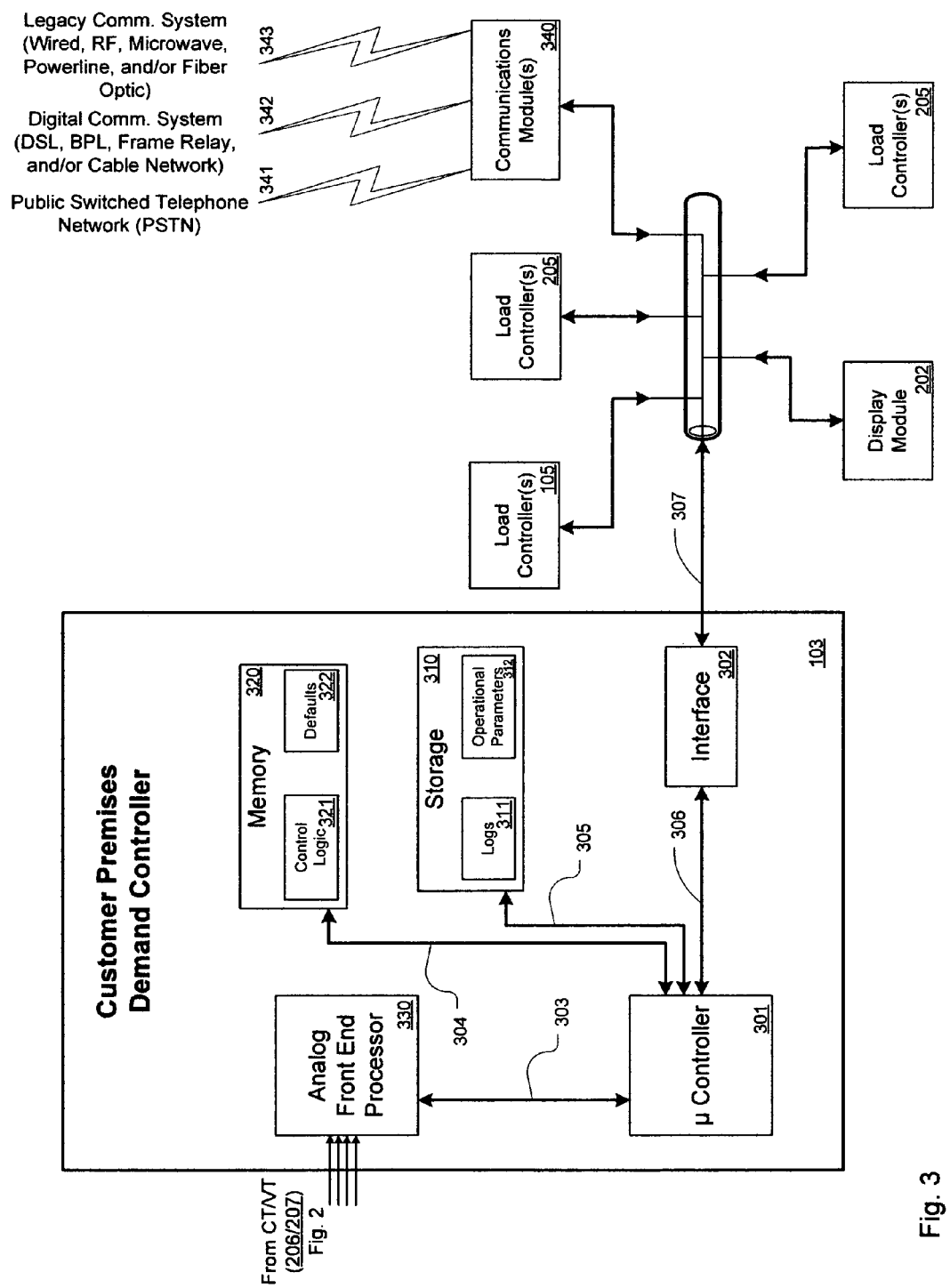
FIG. 3 is a block diagram illustrating an embodiment of a customer premises demand controller and communications system residing at the customer premises of FIG. 2.

FIG. 3 is a block diagram illustrating an embodiment of customer premises demand controller 103 and communications system residing at customer premises 104 of FIG. 2. Demand controller 103 includes at least a micro-controller 301, an interface 302, a storage 310, a memory 320, and an analog front end processor 330, such as the commercially available ADE7753 from Analog Devices or equivalent. Storage 310 includes at least a set of operational parameters 312 and a log 311. Memory 320 includes at least a control logic 321 and a set of default parameters 322.

When analog front end processor 330 senses a zero-cross condition, micro-controller 301 is signaled via connection 303. The micro-controller 301 retrieves and executes the control logic 321 from memory 320, via connection 304, to retrieve the line condition information from analog front end processor 330, via connection 303, and executes the control logic 321 to compare these line conditions with the defined parameters. If one or more of these conditions are outside of the defined parameters, micro-controller 301 will read the operational parameters 312 from storage 310, via connection 305. From these operational parameters 312, the micro-controller 301 will determine what operating load(s) can be shed in order to bring the line conditions back within defined parameters. The micro-controller 301 will, via connection 306 to interface 302, transmit a command to one or more of load controllers 105 or HVAC load controllers 205, each of which is designated by a unique address, to shut off a load(s), also designated by a unique address, via a connection 307.

Irrespective of a line condition being outside of defined parameters, micro-controller 301 will retrieve and execute the controller logic 321 from memory 320, via connection 304 to process and summarize the line condition information. Micro-controller 301 will store the line condition information in the logs 311 of storage 310, via connection 305.

A communications module 340 provides electrical, signal, and protocol conversion between the interface 302 and the outside world. These converted communication systems include, but are not limited to, public switched telephone network 341, digital communications system 342, or legacy communications system 343, as referenced in FIG. 3.

In one embodiment, the components (not shown) residing in communications module 340 that are configured to transmit, receive and convert signals from the public switched telephone network 341 are well known in the art and, therefore, are not described in detail herein. One skilled in the art will realize that such well known components are too numerous to describe in detail herein, and that any configuration of such well known components having the above-described functionality may be implemented in communications module 340. Any such implementation of components configured to receive and convert communication signals from public switched telephone network 341 are intended to be within the scope of this disclosure and to be protected by the accompanying claims.

Another embodiment of the communications module 340 is configured to transmit, receive and convert signals utilizing legacy communication system 343. The components (not shown) residing in the communications module 340 that are configured to transmit, receive and convert signals from the legacy communication system 343 are well known in the art and, therefore, are not described in detail herein. One skilled in the art will realize that such well known components are too numerous to describe in detail herein, and that any configuration of such well known components having the above-described functionality may be implemented in the communications module 340. Any such implementation of components configured to receive and convert communication signals from the legacy communication system 343 are intended to be within the scope of this disclosure and to be protected by the accompanying claims. The legacy communication system 343 is a conventional integrated network of communication technologies that may include conventional wire based communication systems, radio frequency communications, microwave communication systems, powerline communication systems or fiber optics networks. For example, communications module 340 may integrate an radio frequency transceiver to provide connectivity between demand controllers 103 at the plurality of customer premises 104.

In yet another embodiment of the communications module 340, it is configured to communicate via conventional digital communication system 342. The components (not shown) residing in communications module 340 that are configured to transmit, receive and convert signals from digital communication system 342 are well known in the art and, therefore, are not described in detail herein. One skilled in the art will realize that such well known components are too numerous to describe in detail herein, and that any configuration of such well known components having the above-described functionality may be implemented in the communications module 340. Any such implementation of components configured to receive and convert communication signals from the digital communication system 342 are intended to be within the scope of this disclosure and to be protected by the accompanying claims. The digital communication system 342 is a conventional based communication system configured to communicate information in a digital format and may include, but is not limited to, public switched telephone network, powerline, frame relay and/or cable network. Protocols used over these communication systems are well known in the industry and beyond the scope of this document. An example of this embodiment would be a communications module configured to communicate via TCP/IP over a powerline to provide connectivity between demand controller 103 and electricity supplier 201.

The components (not shown) residing in demand controller 103 that are configured to convert and transmit power to the components thereof are well known in the art and, therefore, are not described in detail herein. One skilled in the art will realize that such well known components are too numerous to describe in detail herein, and that any configuration of such well known power supply components may be implemented in demand controller 103 without departing substantially from the operation and functionality of the demand controller 103 as described herein. Any such implementation of the components configured to provide power to the components of demand controller 103 are intended to be within the scope of this disclosure and to be protected by the accompanying claims.

Figure 4:
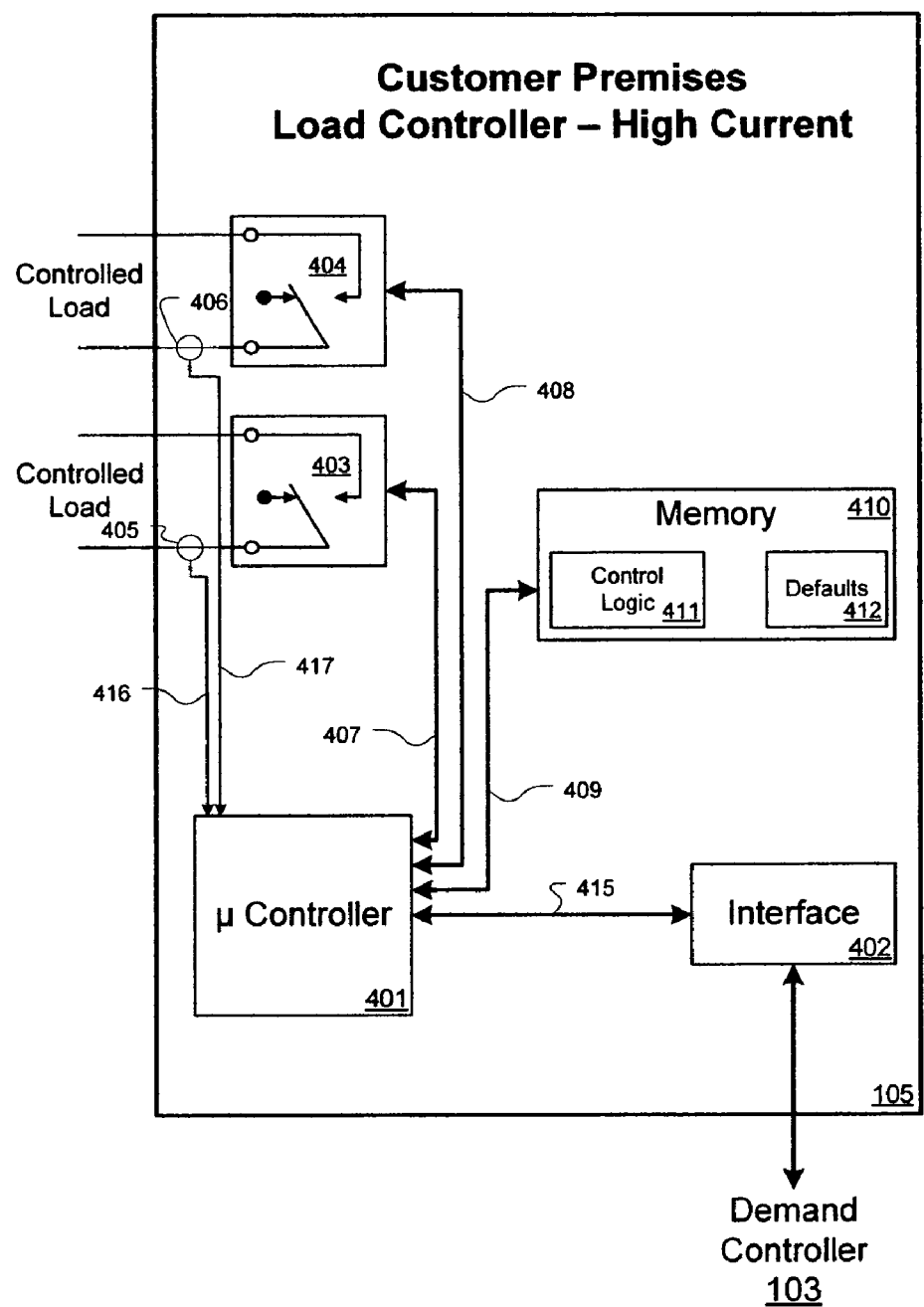
FIG. 4 is a block diagram illustrating one embodiment of a customer premises load controller residing at the customer premises of FIG. 2.

FIG. 4 shows one embodiment of a load controller 105 residing at customer premises 104. Load controller 105 includes at least a micro-controller 401, an interface 402, and a memory 410. Memory 410 includes at least a control logic set 411 and a set of default parameters 412 including a unit address. Additionally, load controller 105 includes relays 403 and 404 connected to micro-controller 401, via connections 407 and 408, respectively. The load controlled by relay 403 is monitored by micro-controller 401 via connection 416 with current transformer 405. The load controlled by relay 404 is monitored by micro-controller 401 via connection 417 with current transformer 406.

When micro-controller 401 receives a shut off command through interface 402, via connection 415, micro-controller 401 retrieves the unit address stored in memory 410 at default parameters 412. Micro-controller 401 retrieves the load controller control logic 411 from memory 410 and executes the control logic to compare the unit address stored in memory 410 at defaults 412 with the received unique address of the command. If the unit address matches the received command address, micro-controller 401 provides a shut off control signal to the specific relay(s) 403 and/or 404 designated in the received command.

When micro-controller 401 has set relay 403 or 404 to allow the attached load to operate, micro-controller 401 monitors current transformers 405 and 406, via connections 416 and 417, respectively. When the attached load is operating, micro-controller 401, via connection 415 to interface 402, notifies demand controller 103 of this condition during the next communication cycle.

Figure 5:
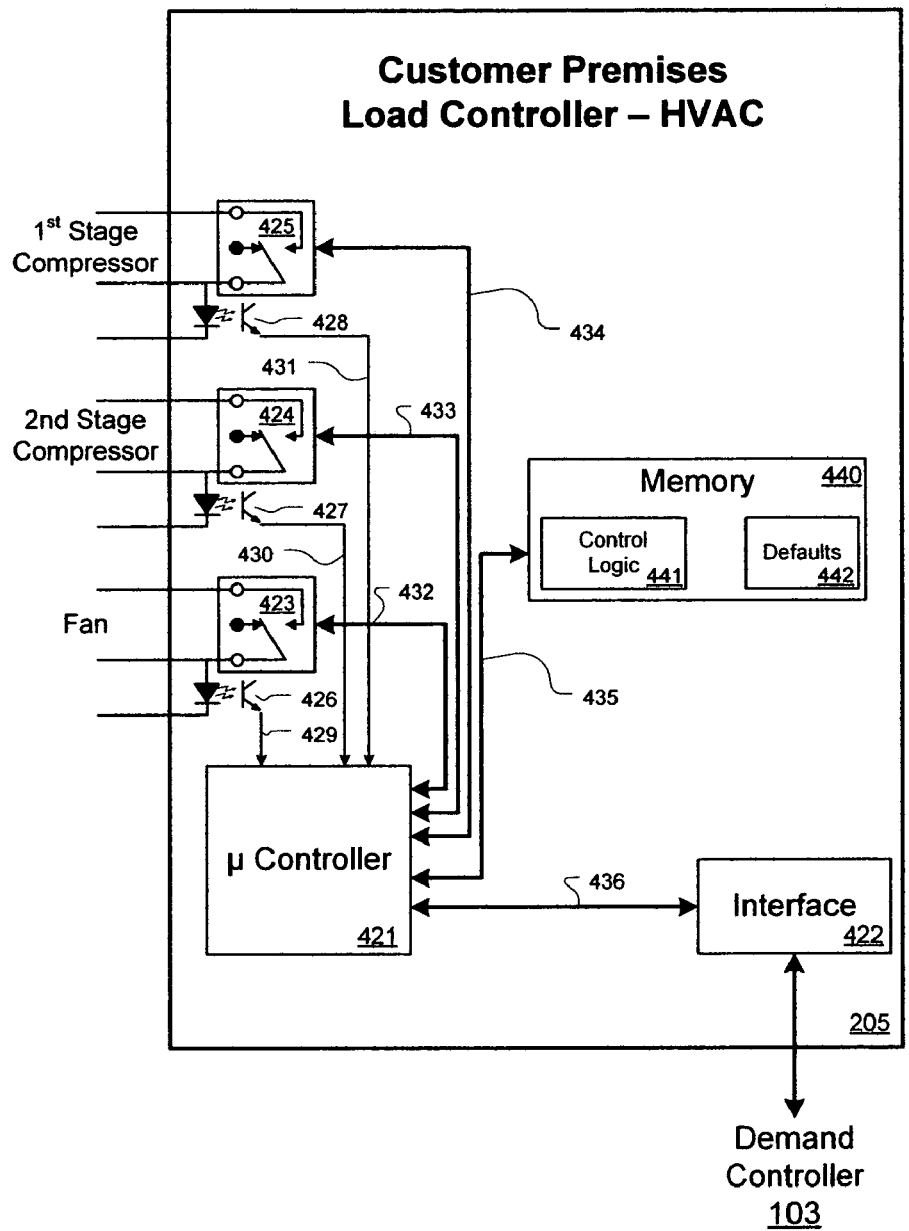
FIG. 5 is a block diagram illustrating another embodiment of a customer premises load controller residing at the customer premises of FIG. 2.

In another embodiment of the HVAC load controller 205 shown in FIG. 5, HVAC load controller 205 includes at least a micro-controller 421, an interface 422, and a memory 440. Memory 440 includes at least a control logic set 441 and a set of default parameters 442 including a unique unit address. Additionally, load controller 205 includes relays 423, 424, and 425 connected to micro-controller 421, via connections 429, 430, and 431, respectively.

When micro-controller 421 receives a shut off command through interface 422, via connection 436, micro-controller 421 retrieves the unit address stored in memory 440 at defaults 442. Micro-controller 421 retrieves the load controller control logic 441 from memory 440 and executes the control logic to compare the unit address stored in memory 440 at defaults 442 with the received unique address of the command. If the unit address matches the received command address, micro-controller 421 provides a shut off control signal to the specific relay(s) 423, 424, and/or 425 designated in the received command.

In addition, micro-controller 421 monitors opto-sensors 426, 427 and 428, via connections 429, 430 and 431, respectively. When thermostat 204, calls for a load attached to relays 423, 424 or 425, opto-sensors 426, 427 or 428 provide a signal to micro-controller 421, via connections 429, 430 or 431, respectively. The signal is received even when the respective relay is open. Micro-controller 421, via connection 436 to interface 422, will notify demand controller 103 of this condition during the next communication cycle.

Figure 6:
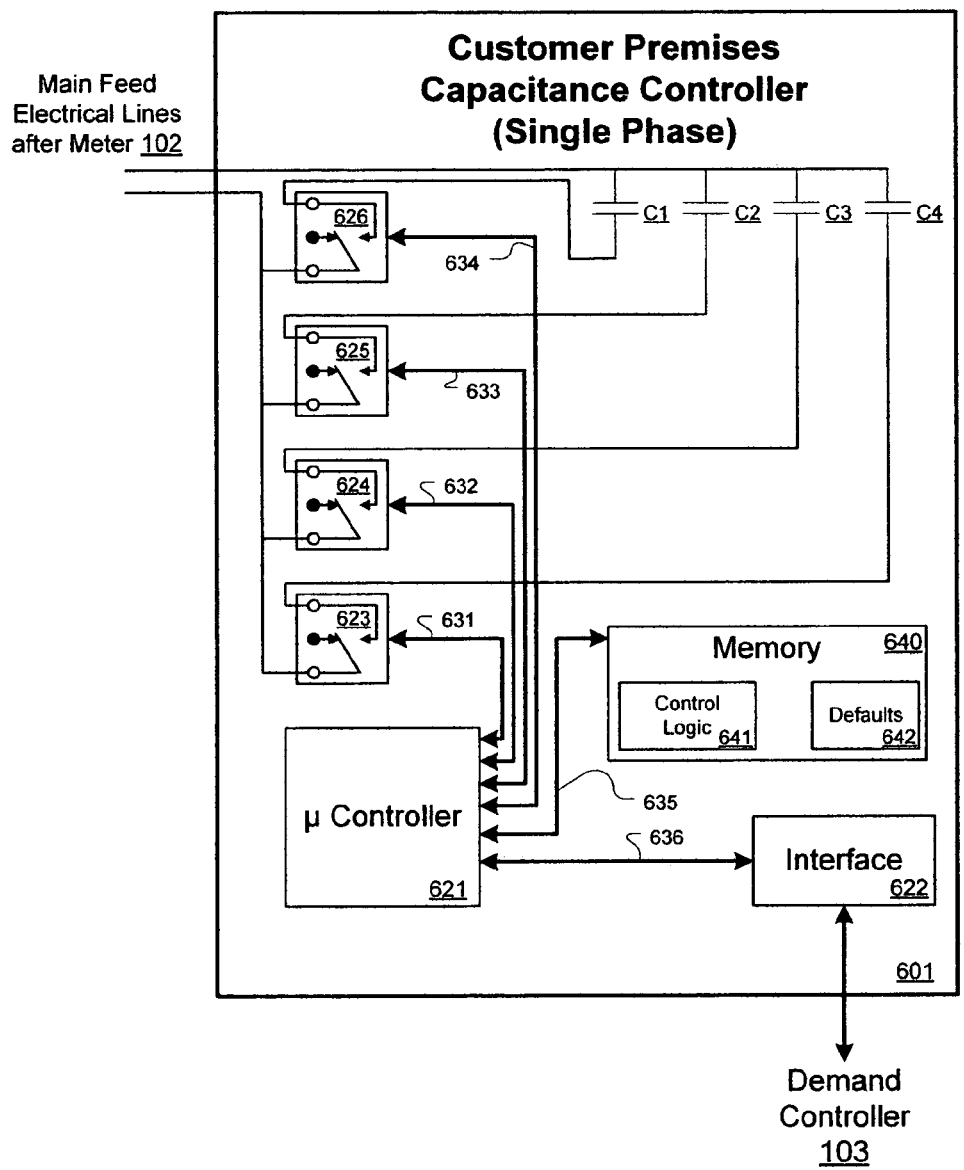
FIG. 6 is a block diagram illustrating an embodiment of a customer premises capacitance controller residing at the customer premises of FIG. 2.

FIG. 6 is a block diagram illustrating an embodiment of a customer premises capacitance controller residing at the customer premises of FIG. 2. This embodiment of demand controller 103 utilizes the power factor information for the customer premises to determine an amount of capacitance that is needed to achieve unity power factor. The capacitance controller 601 includes at least a micro-controller 621, an interface 622, and a memory 640. Memory 640 includes at least the control logic 641 and default parameters 642. Additionally, capacitance controller 601 includes relays 623, 624, 625, and 626 connected to micro-controller 621, via connections 631, 632, 633, and 634, respectively. These relays can be mechanical or solid state, as determined by best suitability for service. The relays 623, 624, 625, and 626 control the connection of capacitors C1, C2, C3, and C4, respectively, to the electrical service. The sizing of C1, C2, C3, and C4 is dependent upon the estimated total reactive load at the customer premises.

When micro-controller 621 receives a close command through interface 622, via connection 636, micro-controller 621 retrieves the unit address stored in memory 640 at defaults 642. Micro-controller 621 retrieves the capacitance controller control logic 641 from memory 640 and executes the control logic to compare the unit address stored in memory 640 at defaults 642 with the received unique address of the command. If the unit address matches the received command address, the micro-controller 621 provides a close control signal to the specific relay(s) 623, 624, 625, and/or 626 designated in the received command.

Figure 7:
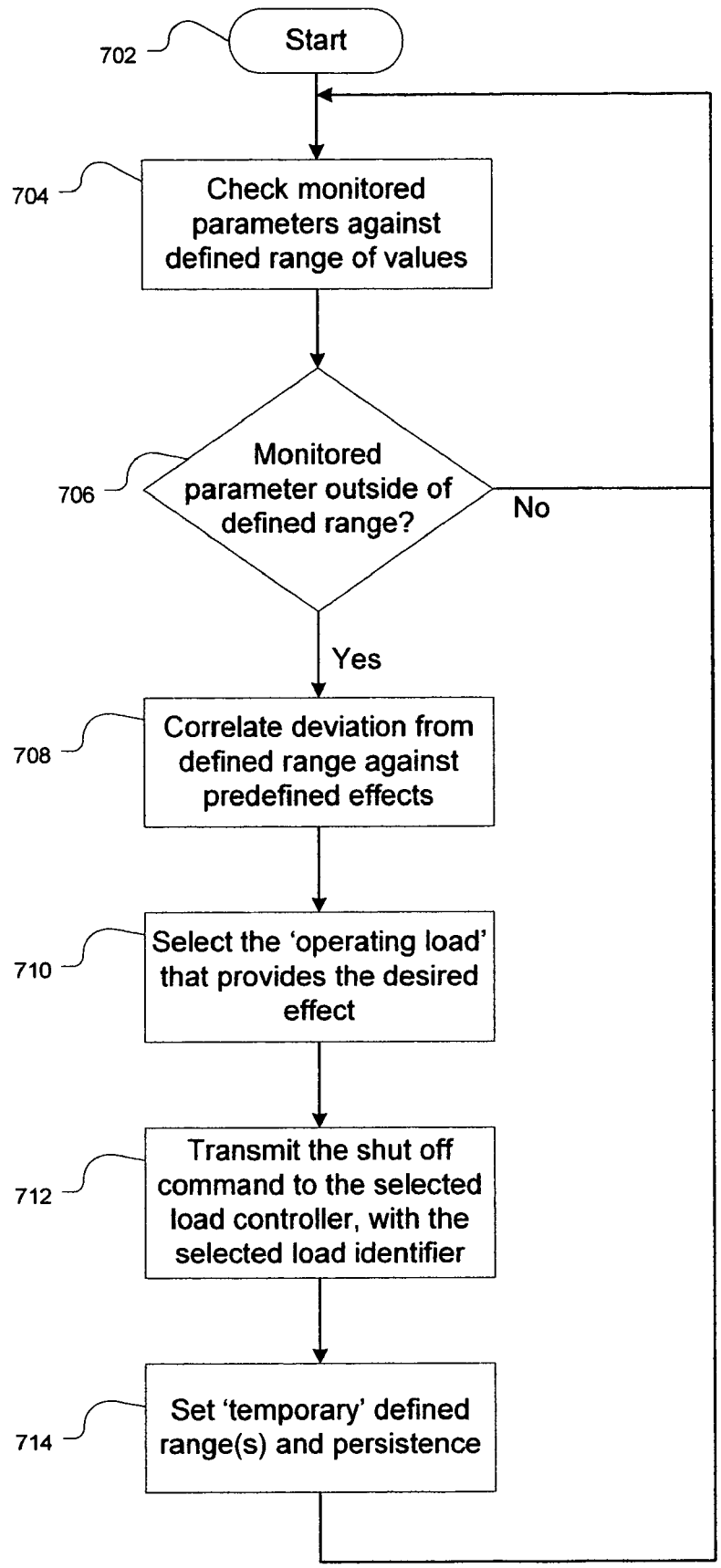
FIG. 7 is a flow chart illustrating a process for determining the state of the customer premises transformer, and thereby the state of its' primary supply system.

FIG. 7 shows the architecture, functionality, and operation of a possible implementation of the software for demand controller control logic 321. In this regard, each block may represent a module, segment, or portion of code, which comprises one or more executable instructions for implementing the specified logical function(s). It should also be noted that in some alternative implementations, the functions noted in the blocks may occur out of the order noted in FIG. 7, or may include additional functions, without departing significantly from the functionality of the process whereby the customer premises demand controller 103 generates a shut off command. For example, two blocks shown in succession in FIG. 7 may in fact be executed substantially concurrently, the blocks may sometimes be executed in the reverse order, or some of the blocks may not be executed in all instances, depending upon the functionality involved, as will be further clarified herein below. All such modifications and variations are intended to be included herein within the scope of this disclosure and to be protected by the accompanying claims.

The process starts at block 702. At block 704, micro-controller 301 executes demand controller control logic 321 residing in memory 320 to determine if any of the monitored parameters are outside of the defined range of values. At block 706, if no parameters are outside of their defined range (the NO condition) the process returns back to block 704.

At block 706, once a monitored parameter is outside of the defined range (the YES condition), the process proceeds to block 708. At block 708, the micro-controller 301 correlates the deviation from the defined range with a plurality of predefined effects anticipated to produce a desired result. That is, the demand controller 103 compares the deviation of the monitored parameter against a plurality of predefined effects having a known energy demand decrease, thereby determining how much demand reduction is needed to offset the deviation. Due to the information extracted by the analog front end processor 330, an additional embodiment of the demand controller 103 provides details relative to real time power factor, as well as peak vs. RMS current loads. This information would provide for a more fine tuned correlation in block 708 of FIG. 7.

At block 710, the micro-controller 301 retrieves nominal demand from storage 310 in operational parameters 312 for each operating load and compares against the needed demand reduction. Micro-controller 301 then retrieves the unique address associated with the matching load from storage 310 in operational parameters 312.

At block 712, micro-controller 301 formulates the proper command structure for a shut off command to the load controllers 105 or 205 associated with the matching load. The command also includes the unique identifier of the specific relay associated with the matching load. Micro-controller 301, via connection 306 to interface 302, transmits the command to load controller 105 or 205.

At block 714, micro-controller 301 will set 'temporary' defined range(s) associated with the monitored parameter(s) that were initially out of range, as well as a duration of persistence. That is, the values used for a parameters defined range will be adjusted for a defined period of time to allow for the demand change to have an effect. Due to the monitoring of parameters on a cycle-by-cycle basis, this is required in order to alleviate a cascading response. The process then returns to block 704.

In one embodiment of this control logic, the plurality of demand controllers 103 residing at the plurality of customer premises 104, fed by a common customer premises transformer 101, would be in communication with each other and thereby have access to the real time demand placed on the customer premises transformer 101 by each of the plurality of customer premises 104. This information allows for the mathematical analysis of the primary side of the customer premises transformer 101. Thus providing a more accurate definition of the out-of-range values for each of the monitored parameters.

Figure 8:
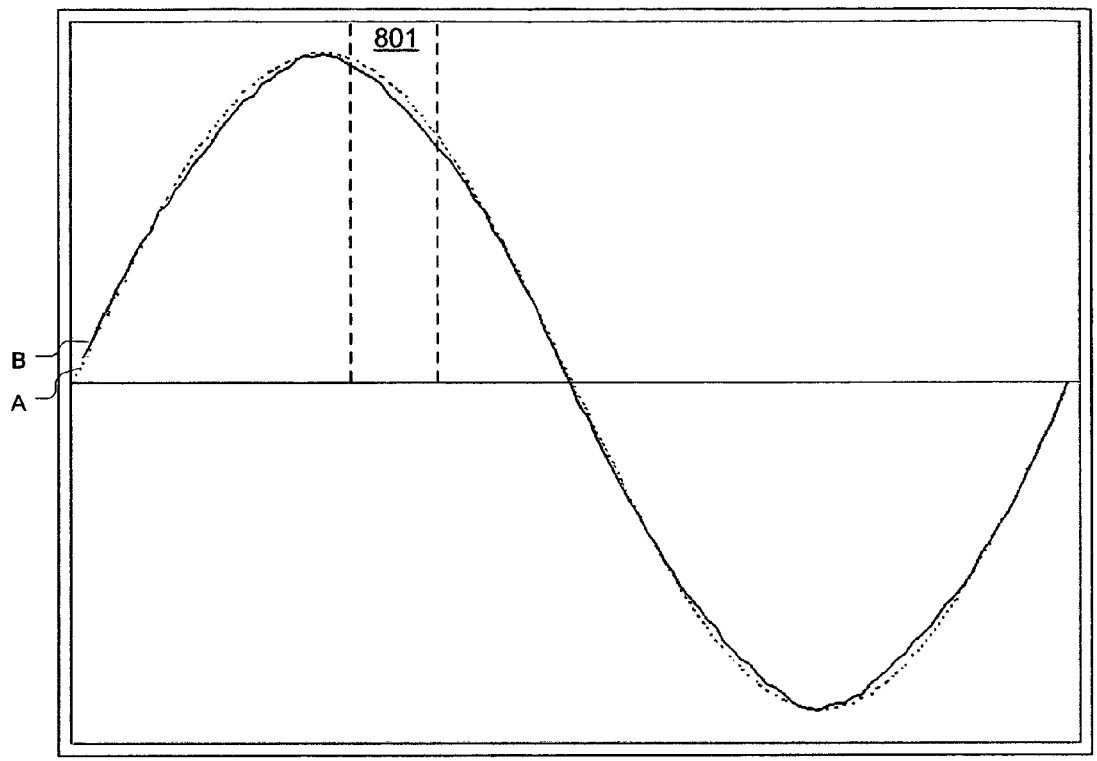
FIG. 8 is a normalized real-world waveform shown in comparison to an ideal sinusoid.

FIG. 8 is a normalized real-world waveform 'B' shown in comparison to an ideal sinusoid 'A'. This comparison emphasizes the variations seen between two waveforms that have the same amplitude and period. Real-world waveforms are in fact a composite of numerous waveforms having various amplitudes and periods. It is due to this fact that critical information about the energy delivery system can only be derived from a waveform analysis. Individual values that quantify a waveform, such as RMS, peak or period, cannot represent the many specific characteristics of an energy delivery system that may be over stressed. This ability to extract positional particular data in a waveform allows for customizable regions 801 that define areas of concern specific to the electricity supplier. These regions, along with their cause-and-effect, may be added to the list of monitored parameters which the demand controller 103 uses to determine the need for load shedding. Additionally, logged data, including waveforms, can be reviewed by the electricity supplier to assist in identifying delivery system strengths and weaknesses.

One skilled in the art will appreciate that demand controller 103 may be configured in an infinite number of operating modes to provide any desired degree of control and flexibility. A network of customer premises transformers 101, each monitored by the plurality of intelligent demand controllers 103, provides the electricity supplier with a system of self regulating loads that would follow the capabilities of the energy delivery system without undo inconvenience to the customer and minimal impact upon the electricity supplier's revenue stream.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the accompanying claims.

What is claimed is:

1. An autonomous power demand limiting system for a customer premises transformer which intelligently limits power demand comprising:

at least one demand controller fed by a common customer premises transformer, each of the at least one demand controller being identified by a unique demand controller identification code, coupled to a main feed electrical line at the customer premises and configured to monitor the conditions under which the common customer premises transformer is operating and further comprising an interface coupled to a communications network in electrical communication with the demand controller;

at least one load controller in communication with each of the at least one demand controllers, each of the at least one load controllers being identified by a unique load controller identification code and configured to have a load coupled to a relay, the relay with a unique relay identification code being configured to monitor and communicate the real-time current utilized by the load; wherein the communication network is selected from a group consisting of a public switched telephone network, a digital communications system and a legacy communication system and wherein each of the at least one demand controller determines the state of the local supply transformer from the monitored parameters and calculates a response to an out-of-range line condition that will bring the respective parameter back in range such that a shut off command is formulated for a known operating load and transmitted by the demand controller to the appropriate load controller using the unique load controller identification code, the appropriate load controller using the unique demand controller identification code, the load controller sending a shut off command to the relay with the unique relay identification code to shut off that operating load.

2. The power demand limiting system of claim 1 further comprising a capacitance controller in communication with and corresponding to each demand controller and residing at the customer premises, wherein the demand controller analyzes a power factor of the customer premises transformer and transmits a formatted instruction to the capacitance controller such that capacitors are switched in or out of the electricity supply in order to bring the power factor back in range, thereby allowing full utilization of the customer premises transformer capacity.

3. The power demand limiting system of claim 1 wherein an electricity supplier communicates with a demand controller via the communications system to set out-of-range definitions and retrieve operating logs.

4. The power demand limiting system of claim 1 wherein a customer communicates with a demand controller via the communications system to establish load shedding priorities and exceptions and retrieve operating logs.

5. The power demand limiting system of claim 1 wherein each demand controller collects waveforms in order to extract positional data from customizable regions of the waveform and thereby determines conditions existing on the primary side of the customer premises transformer that can be an early indicator of a systemic problem, the waveforms being stored in the operating logs for further analysis.

* * * * *